United States Patent [19]

Kobayashi

[11] Patent Number: 4,538,760
[45] Date of Patent: Sep. 3, 1985

[54] AIR CONDITIONER CONTROL ARRANGEMENT FOR AUTOMOTIVE VEHICLE OR THE LIKE

[75] Inventor: Shinma Kobayashi, Hiratsuka, Japan

[73] Assignee: Nissan Shatai Company, Limited, Hiratsuka, Japan

[21] Appl. No.: 526,428

[22] Filed: Aug. 25, 1983

[30] Foreign Application Priority Data

Aug. 27, 1982 [JP] Japan .................. 57-147833
Aug. 30, 1982 [JP] Japan .................. 57-129726[U]

[51] Int. Cl.³ ........................................ G05D 23/00
[52] U.S. Cl. ..................... 237/2 A; 236/13; 236/91 F
[58] Field of Search ............ 236/13, 49, 91 F, 91 G, 236/46 F; 237/2 A, 12.3 A, 12.3 B; 62/178; 165/12, 16, 43; 98/2.05

[56] References Cited

U.S. PATENT DOCUMENTS

| | | |
|---|---|---|
| 2,189,895 | 2/1940 | Grutzner .................. 237/2 A |
| 3,658,244 | 4/1972 | Caldwell . |
| 3,814,173 | 6/1974 | Coon . |
| 3,934,642 | 1/1976 | Coulson et al. . |
| 4,311,188 | 1/1982 | Kojima et al. . |
| 4,325,426 | 4/1982 | Otsuka et al. . |
| 4,344,565 | 8/1982 | Kojima et al. . |
| 4,383,642 | 5/1983 | Sumikawa et al. . |
| 4,406,397 | 9/1983 | Kamata et al. . |
| 4,407,446 | 10/1983 | Iijima et al. . |
| 4,407,447 | 10/1983 | Sayegh . |
| 4,408,713 | 10/1983 | Iijima et al. .................. 236/49 |
| 4,417,688 | 11/1983 | Schnaibel et al. . |
| 4,460,036 | 7/1984 | Yoshimi et al. . |

FOREIGN PATENT DOCUMENTS 58-145518 8/1983 Japan .
2090966 7/1982 United Kingdom .

Primary Examiner—Henry Bennett
Attorney, Agent, or Firm—Schwartz, Jeffery, Schwaab, Mack, Blumenthal & Evans

[57] ABSTRACT

The blower of an air conditioner is either (a) rotated at an ultra low speed until a first predetermined air temperature is sensed in the duct in which the blower is disposed, or (b) is temporarily disabled until a minimal engine coolant temperature is sensed, whereafter in both cases the rotational speed of the blower is stepped up a little to a still "low" level and held at this level until the temperature of the air discharged from the duct has risen to a second predetermined temperature. Subsequently the rotational speed of the blower is increased at a suitable rate until a maximum rotational level is reached.

20 Claims, 8 Drawing Figures

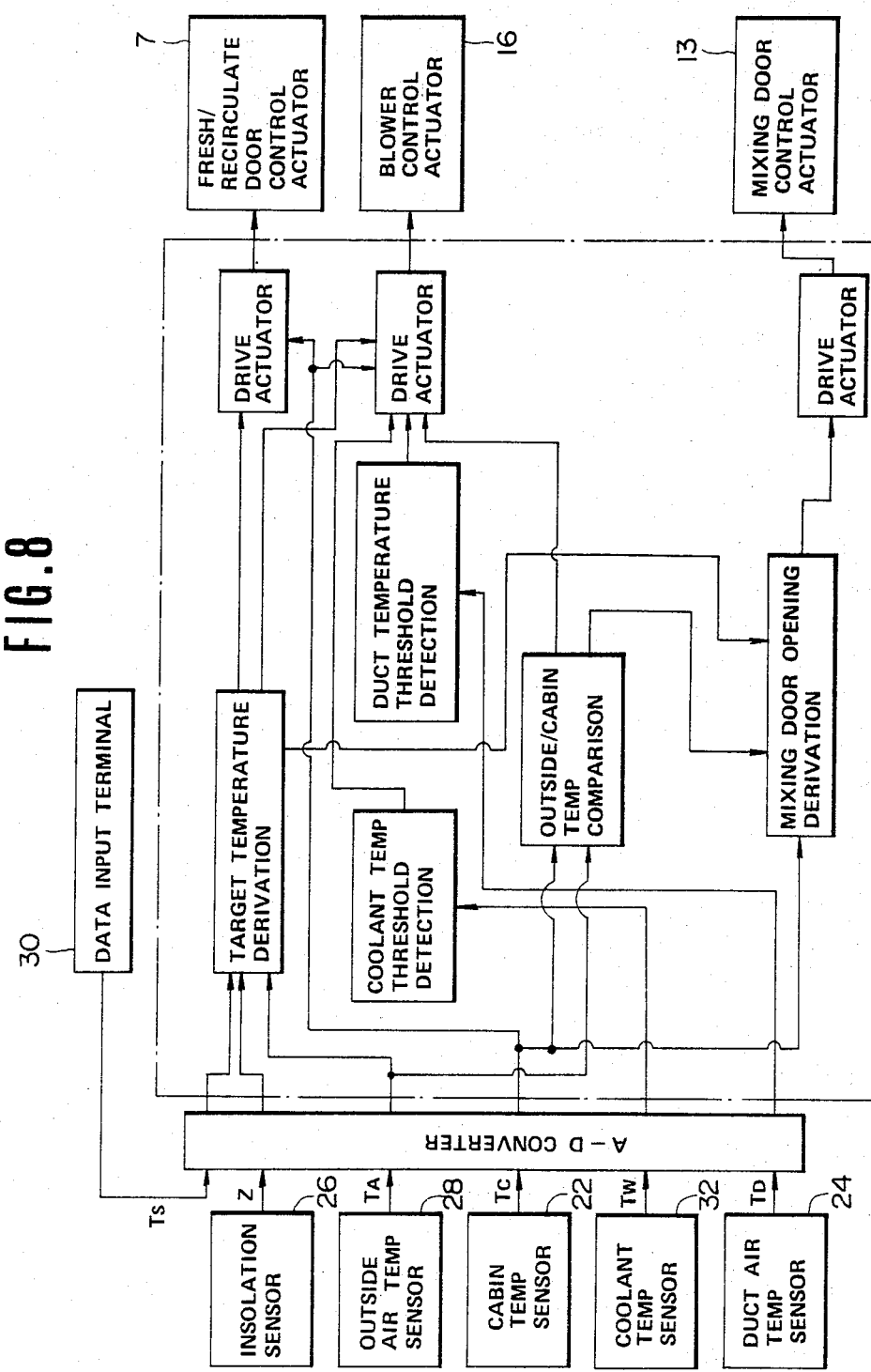

AIR CONDITIONER CONTROL ARRANGEMENT FOR AUTOMOTIVE VEHICLE OR THE LIKE

BACKGROUND OF THE INVENTION

1. Field of the Invention

The present invention relates generally to an air conditioner and more specifically to an improved control arrangement therefor.

2. Description of the Prior Art

In a previously proposed air conditioning arrangement it has been arranged that during cold weather the blower motor of the air conditioner is disabled until the engine coolant has reached an adequately high temperature in order to avoid cold air from being undesirably blown into the vehicle cabin during cold engine starts. This, while proving effective, has suffered from the drawback that, due to the prolonged period during which the blower (Viz., fan motor) is disabled, the vehicle occupants are often subjected to the concern that the air conditioner is perhaps wholly, or in part, malfunctioning.

SUMMARY OF THE INVENTION

It is an object of the present invention to overcome the above mentioned drawback by energizing the fan motor as early as possible after the air conditioning unit has been switched on and to control the speed of the fan with respect to the temperature of the air flowing through the duct in which the fan and other apparatus are installed.

In brief the invention features an arrangement wherein the blower of an air conditioner is either rotated at an ultra low speed from the moment the air conditioning unit is switched on (viz., switched on to the "automatic" mode) until a first predetermined air temperature is sensed in the duct in which the blower is disposed, or alternatively, the blower is temporarily disabled until a minimal engine coolant temperature is sensed, whereafter the rotational speed of the blower is stepped up a little to a still low level until the temperature of the air dicharged from the duct has risen to a second predetermined temperature. Subsequently the rotational speed of the blower is increased at a suitable rate until a maximum rotational level is reached.

In more detail the present invention takes the form of an air conditioning unit for a vehicle having a cabin and which comprises: a duct into which air may be inducted and discharged into the cabin, a source of heated fluid, a heat exchanger through which the heated fluid circulates, the heat exchanger being arranged to heat the air in the duct, a blower associated with the duct and energizable to induce air to flow through the duct, and a circuit for energizing the blower at a first predetermined level until the air in the duct may be heated to a first predetermined temperature and thereafter maintaining the energization of the blower at a second predetermined level higher than the first predetermined level, until the air in the duct is sensed to be at a second predetermined temperature.

BRIEF DESCRIPTION OF THE DRAWINGS

The features and advantages of the arrangement of the present invention will become more clearly appreciated from the following description taken in conjunction with the accompanying drawings in which:

FIG. 1 is a schematic representation of a computer controlled air conditioning arrangement adapted for use with an enclosed space such as the passenger cabin of an automatic vehicle or the like;

FIG. 8 is a schematic representation of a microcomputer and associated apparatus arrangement according to a second embodiment of the present invention.

DETAILED DESCRIPTION OF THE PREFERRED EMBODIMENTS

Figure 1:
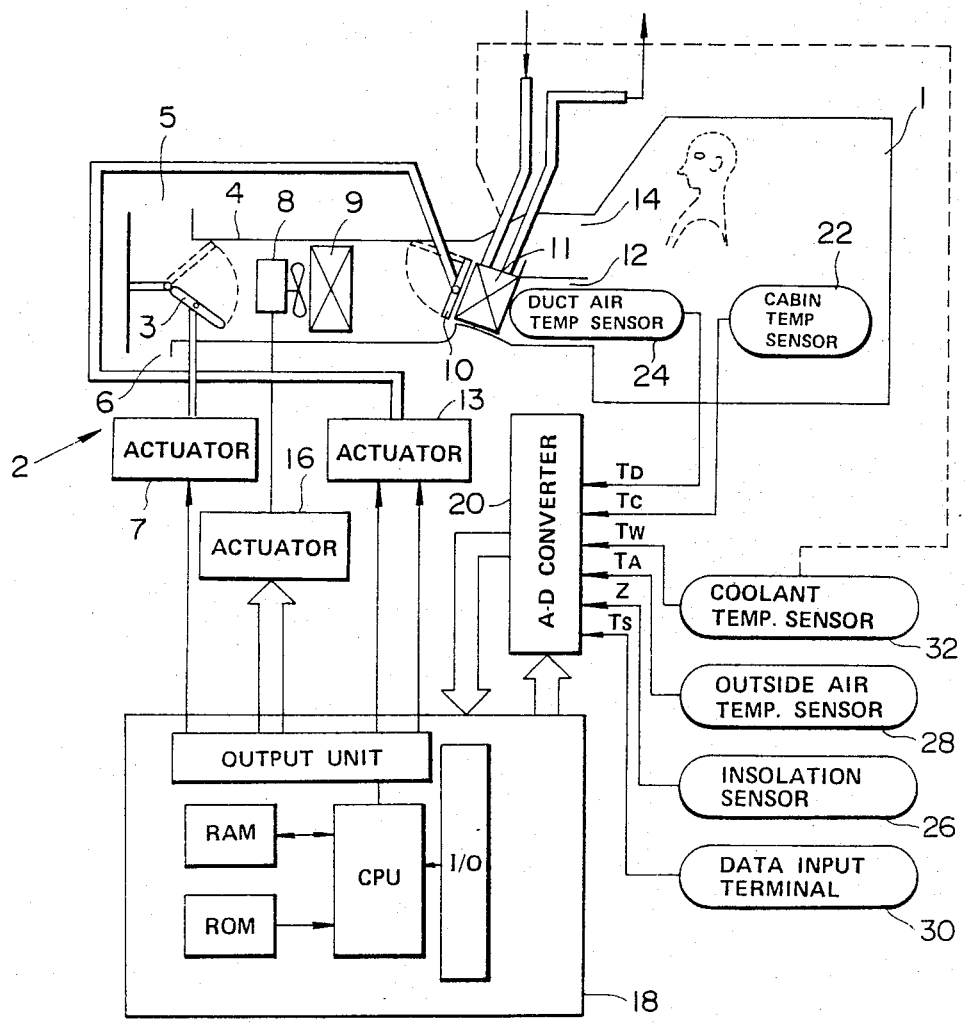

Turning now to FIG. 1 an air conditioning arrangement to which the first and second embodiments of the present invention may be applied, is shown. In this arrangement "air-conditioned air" is discharged into a vehicle cabin 1 or the like by an air conditioning unit generally indicated by the numeral 2. This air conditioning system or unit is, by way of example, the type wherein air may be selectively inducted from the ambient atmosphere surrounding the cabin or from the cabin 1 per se, to be recirculated back thereinto, via a door 3 mounted at or near the upstream end of a duct 4. The duct is as shown, provided with an atmospheric air induction port 5 and a recirculation port 6. The position of the door 3 is controlled by an actuator 7.

Located downstream of the door 3 is a fan or blower 8.

Located downstream of the blower 8 is a evaporator 9 via which heat may be extracted from the air forced to flow through the duct 4 by the blower 8.

Further downstream of the evaporator 9 is a mixing door 10 followed by a heater core 11 through which heated fluid such as engine coolant is circulated in a known manner.

As shown, the heater core 11 is disposed in a sub passage 12 of the duct 4 so that the mixing door 10 (under the motive influence of an actuator 13) may be set to vary the fraction of air directed to flow through and/or over the heater core 11 as compared to that fraction which is forced to flow through the sub passage 14. With this arrangement the amount of heat imparted to the air introduced into the cabin may be controlled.

In this air conditioning unit the previously mentioned actuators (7, 13) are controlled along with a blower motor actuator 16 by a microcomputer 18 which receives inputs via an analog-digital (A-D) converter 20 from a plurality of sensors including a cabin temperature sensor 22, a duct air temperature sensor 24 senses the temperature of the air being discharged from the sub passage 12, a sunlight intensity or insolation sensor 26, and an outside or ambient air temperature sensor 28. These sensors, together with a coolant temperature sensor 32, thus sense a variety of parameters which may be used as blower control parameters. In the preferred embodiment, duct air temperature and/or coolant temperature are used as blower control parameters. It will be readily apparent to one of ordinary skill in the art, however, that any parameter indicative of air conditioning operation, for example, discharge air temperature, may be used, depending upon the type of operational control it is desired to effect. The computer further receives data input from a manually operable terminal 30 disposed in the cabin. This device serves to enable the desired or target cabin temperature ($T_S$) to be inputted by the cabin occupant or occupants to the microcomputer 18.

Figure 2:
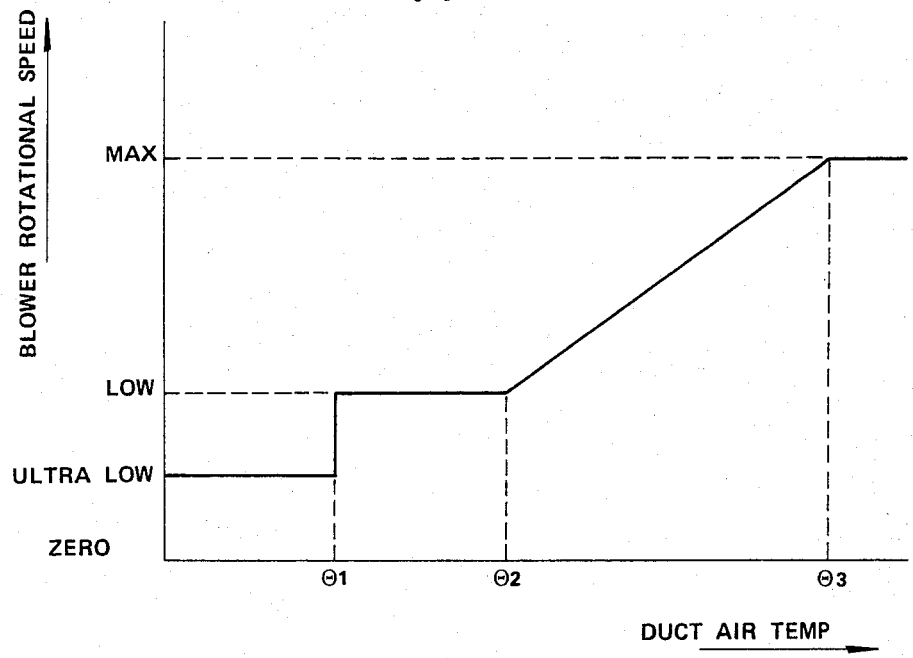
FIG. 2 is a graph showing, in terms of fan or blower rotational speed and the temperature of the air flowing through the duct in which the blower is disposed, the control characteristics achieved by the first embodiment of the present invention.

FIG. 2 is a graph illustrating the blower speed control which characterizes the first embodiment of the present invention.

As shown in this Figure, the blower 8 is energized with the air conditioning unit being switched on to its automatic mode, to rotate at an ultra low RPM just adequate to move air through the duct 4 and thus render it possible for the duct air temperature sensor 24 to alone sense the instantaneous heating capacity of the air conditioner. The speed of the blower is maintained at this ultra low level until the duct air sensor 24 indicates that the temperature of the air flowing in the duct 4 has reached a first predetermined temperature (viz., $\theta_1$) whereafter a program stored in the ROM of the microcomputer 18 induces the latter to output a signal to actuator 16 which accordingly steps up the rotational speed of the blower to a slightly higher "low" level.

The speed of the blower 8 is subsequently maintained at this new "low" level until the duct sensor 24 indicates that the temperature of the air has risen further to a second predetermined temperature or level $\theta_2$. Upon the air temperature rising to the just mentioned second predetermined temperature, the program induces the situation wherein the blower speed is increased gradually to its maximum value. As shown, the maximum rotational speed is obtained at a duct air temperature of $\theta_3$ which is preselected to be adequate for the given blower speed.

Figure 3:
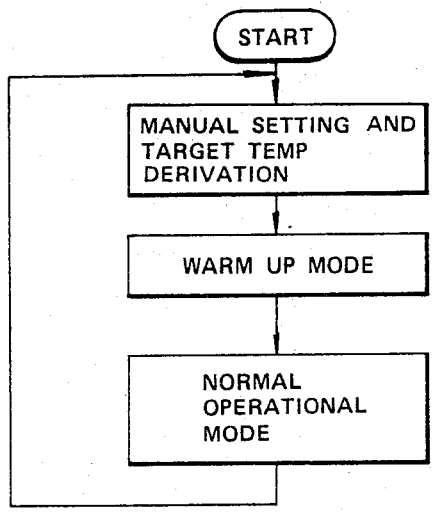
FIG. 3 is a flow chart showing the control stages or steps via which the control of the first embodiment is realized.

FIG. 3 shows in simple flow chart form, the stages via which the operational characteristics shown in FIG. 2 are obtained. That is to say, after the "START" stage, the desired cabin temperature inputted from the manually operable terminal 30 is read and a target temperature ($T_{SL}$) is calculated. The program then enters the "warm up" stage or mode and thereafter in the last stage proceeds to enter into its normal closed loop automatic control mode.

Figure 4:
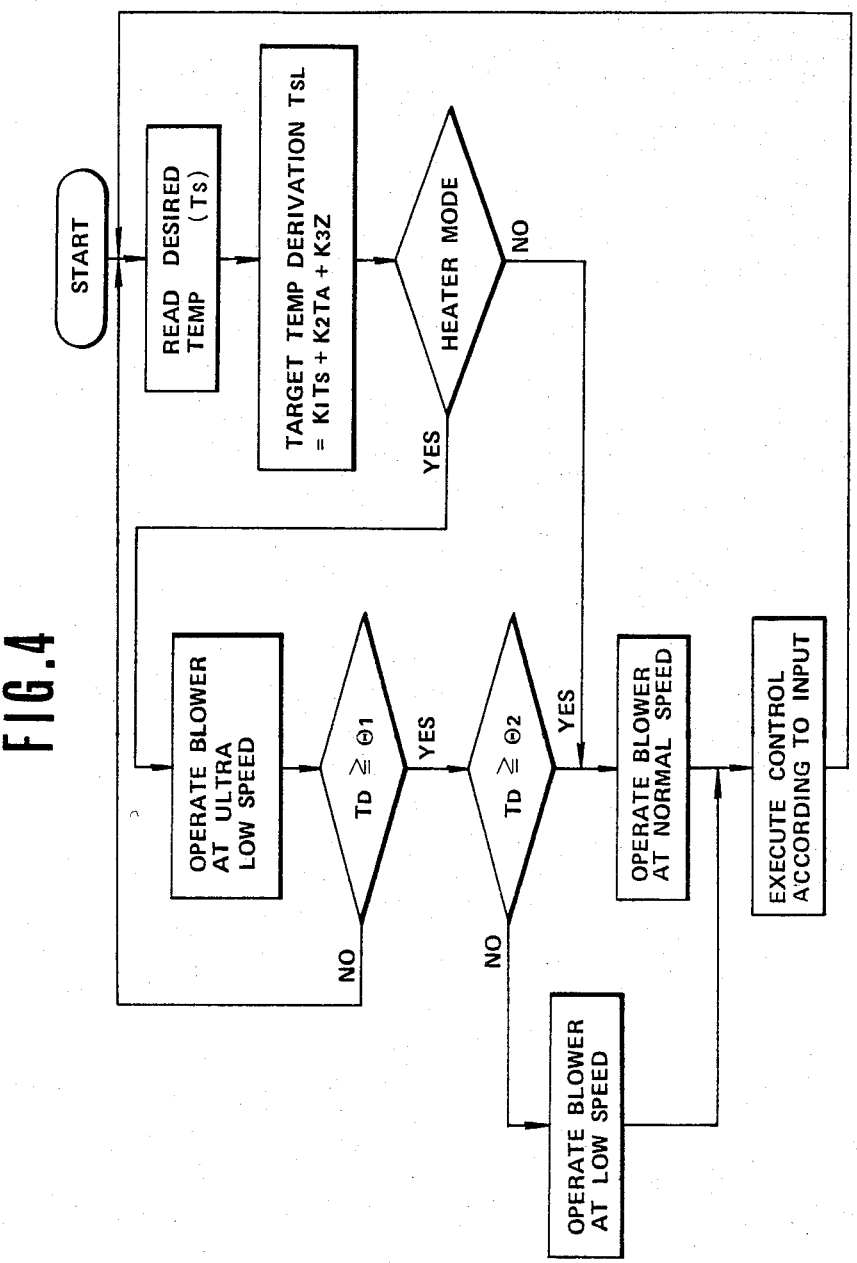
FIG. 4 is a flow chart showing in detail the steps involved in the chart shown in FIG. 3.

FIG. 4 shows the above mentioned control sequence in more detail. As shown, after the program is started by switching on the air conditioning unit, the cabin temperature ($T_S$) desired by occupants is read. Next the target temperature ($T_{SL}$) to which the air must be heated, to in fact achieve the desired temperature, is calculated via use of the following equation:

$$T_{SL} = K_1 T_S + K_2 T_A + K_3 Z$$

wherein:

$K_1$, $K_2$, and $K_3$ are constants;

$T_S$ is the manually set temperature inputted from the terminal;

$T_A$ is the temperature of the air outside the vehicle; and

Z is the degree of insolation (exposure to sunlight) to which the vehicle is subjected.

At the next stage of the program the question is raised as to whether the air conditioner should enter the heater mode. This decision may be made based on the difference between the cabin temperature and/or and the manually set desired temperature. If the answer to the question raised at this stage is NO, then the warm up program is by-passed and the air conditioning unit is put into its normal automatic mode of operation. However, if the answer to the question is YES, then the program proceeds to the next stage where the blower is energized at the previously mentioned ultra low RPM until the duct temperature $T_D$ is sensed to be equal or greater than the first predetermined temperature $\theta_1$. In the next stage the duct temperature $T_D$ is compared with the second predetermined temperature $\theta_2$ and the blower maintained at "low" RPM until the duct temperature rises to and/or exceeds $\theta_2$. Subsequent to the duct temperature being sensed at or above temperature $\theta_2$ the warm-up program terminates and the air conditioner enters a normal operation routine.

Figure 5:
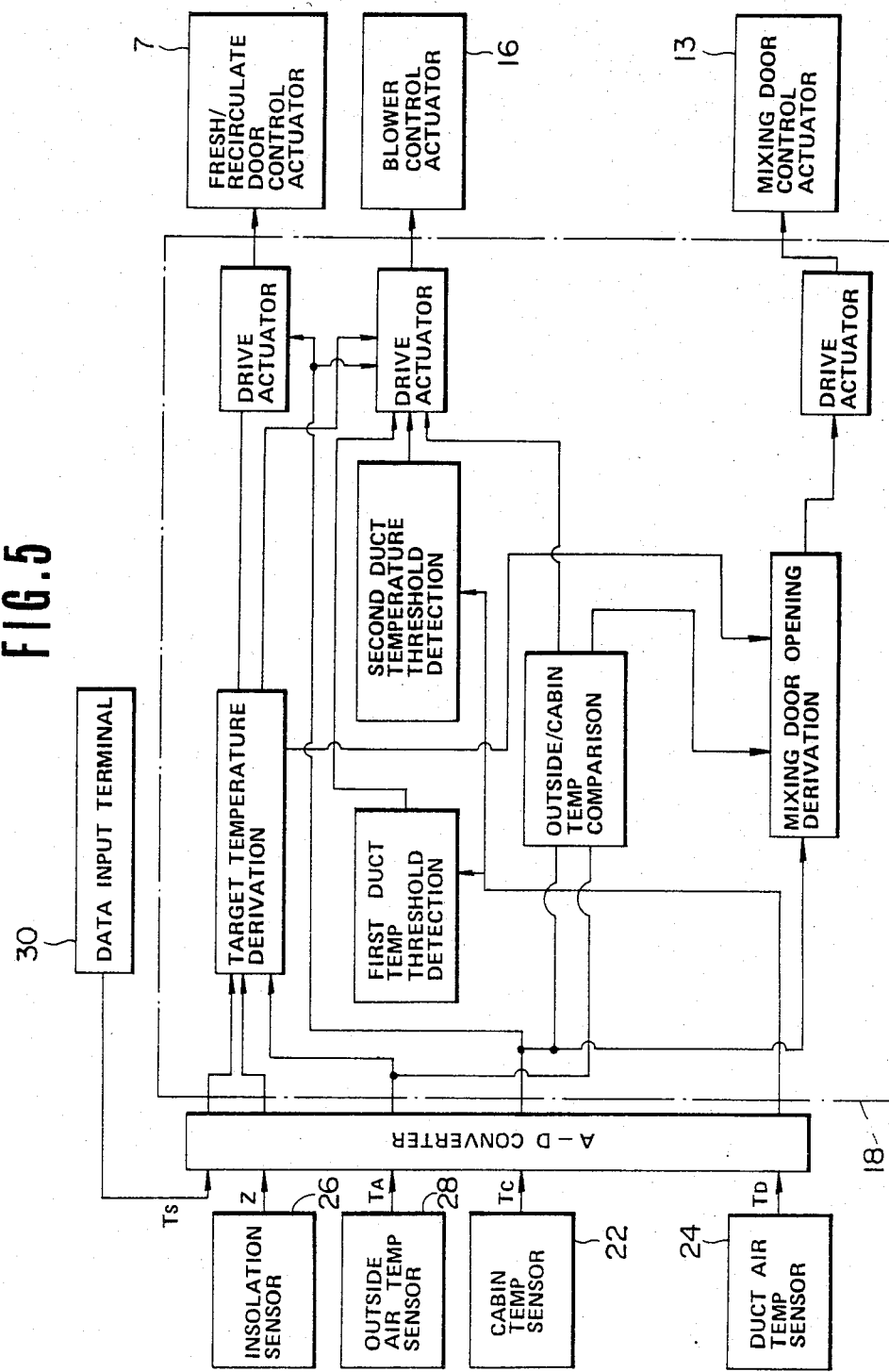
FIG. 5 is a schematic representation of the microcomputer and the associated apparatus via which the control which characterizes the first embodiment of the present invention is executed.

FIG. 5 shows a highly schematic representation of the microcomputer 18 and associated hardware via which the previously described program control is achieved. However, before proceeding with a detailed description of FIG. 5 it should be pointed out that the program described above may be carried out using one of a number of known techniques such as a two dimensional table look up, wherein a table of the nature of the graph of FIG. 2 is suitably stored in the ROM of the computer, or the like, and that following description is meant to supplement the disclosure relating to the first embodiment made up to this point.

In FIG. 5 a plurality of sensors, namely the insolation sensor 26, the outside air temperature sensor 28, the cabin (air) temperature sensor 22 and the duct air temperature sensor 24 are arranged to input analog signals Z, $T_A$, $T_C$ and $T_D$ respectively to an analog-digital (A–D) converter. The manually operable terminal 30 installed in the vehicle cabin is arranged to input the previously mentioned desired temperature data $T_S$. This latter mentioned device may be arranged to by-pass the A–D converter in the case it is capable of generating a digital output signal.

The various inputs from the A–D converter are, as shown, processed so as to derive the target temperature $T_{SL}$, compare the outside air temperature ($T_A$) with that of the cabin air ($T_C$), detect the first duct temperature threshold ($\theta_1$) the second duct temperature threshold ($\theta_2$) and derive the appropriate setting of the mixing door 10. Subsequently, actuator driver units output suitable control signals respectively to the fresh/recirculate door control actuator 7, the blower control actuator 16 and the mixing door control actuator 13.

The above mentioned functions although not specifically mentioned in the flow chart should be understood as being carried out in the step referred to as "execute control according to input".

Although the above illustrates the functions provided by the microcomputer it will be readily appreciated that the functions indicated in FIG. 5 could be carried out by appropriate digital and/or analog circuits. For example, the first and second duct temperature threshold dectection functions could be provided by simple comparator circuits if desired.

Figure 6:
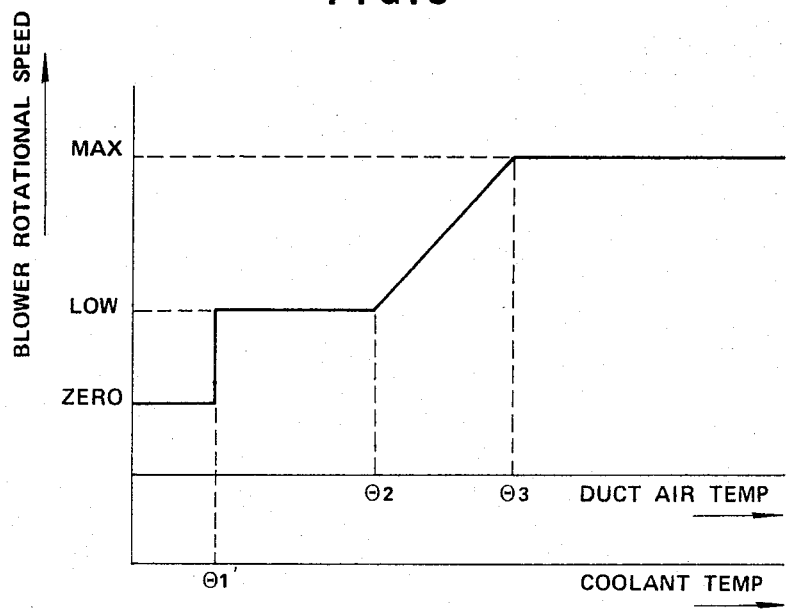
FIG. 6 is a graph similar to that of FIG. 2 but showing the control characteristics provided by a second embodiment of the present invention.

FIG. 6 is a graph showing the control characteristics of a second embodiment of the present invention. In this arrangement, to avoid the possibility that a lady passenger or driver (for example) may feel some discomfort due to the cold but very weak draft of air being blown through the air duct right from the moment of switching the air conditioning unit on, it is proposed in this embodiment to disable the blower until a minimal coolant temperature ($\theta_1'$) is sensed by a coolant temperature sensor 32 and thereafter control the operation of the blower in response to the output of the duct air temperature sensor 24 as in the previous embodiment.

Figure 7:
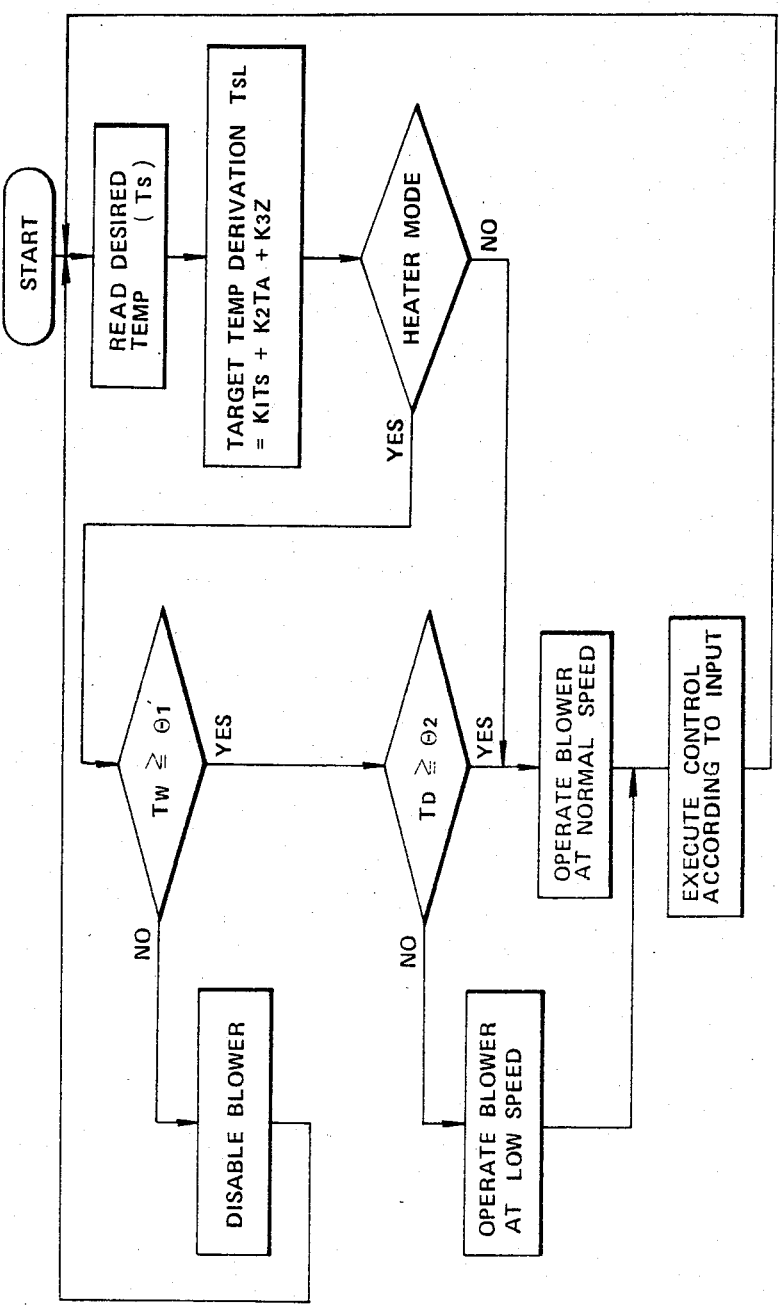
FIG. 7 is a flow chart showing the steps via which the second embodiment achieves its characteristic control.

FIG. 7 is a flow chart illustrating the program followed by the second embodiment.

Following the START of the program, the manually set desired temperature ($T_S$) is read and subsequently the necessary target temperature ($T_{SL}$) required in view of the various factors influencing the environment of the vehicle cabin, is calculated. In this instance the calculation is carried out in the same manner as in the first embodiment. Next the decision is made as to whether the heater mode is required. If not required, the program enters into the normal operating mode. However, if the heater mode is required, the program proceeds to the warm-up mode wherein, in the case that the coolant temperature $T_W$ is sensed as being lower than $\theta_1'$ then the blower motor is disabled (viz., is not energized). However, upon $T_W$ becoming equal to or exceeding $\theta_1'$ the program then induces the blower to rotate at a given low speed until such time as the duct temperature $T_D$ is sensed as being equal or greater than $\theta_2$ whereafter the warm-up mode terminates, and a normal operational routine of the nature described in connection with the first embodiment is carried out.

FIG. 8 is a figure similar to FIG. 5 but wherein the arrangement illustrated therein includes the coolant temperature sensor 32 which inputs a signal via the analog-digital (A-D) converter 20. The functions carried out in the microcomputer in this case are essentially the same as in the case of the first embodiment except that the first duct temperature threshold detection is replaced with a coolant temperature threshold detection function.

If should be noted that the duct air temperature sensor need not be disposed in the duct per se and may be mounted at any suitable location such as immediately downstream of the discharge port or opening thereof.

What is claimed is:

1. An air conditioning unit for a vehicle having a cabin, comprising:
   a duct for inducting air and for discharging the inducted air into said cabin;
   a source of heated fluid;
   a heat exchanger through which said heated fluid circulates, said heat exchanger being arranged to heat the air in said duct;
   a blower associated with said duct and energizable to induce air to flow through said duct;
   a sensor for sensing the temperature of said air in said duct, and for producing a signal indicative of the sensed duct air temperature; and
   control means, responsive to said sensor and connected to said blower, for driving said blower at a standby speed when said signal indicates that the temperature of the duct air is below a first predetermined value, for driving said blower at a minimum speed greater than said standby speed when said signal indicates that the temperature of the duct air is above said first predetermined value and below a second predetermined value greater than said predetermined value, and for increasing the speed of said blower to a controlled speed in a range between said minimum speed and a maximum speed when said signal indicates that the duct air temperature is above said second predetermined value,
   said control means further comprising means for deriving said controlled speed based on blower control parameters.

2. An air conditioning unit as claimed in claim 1, wherein said standby speed is zero.

3. An air conditioning unit as claimed in claim 1, further comprising a second sensor, said second sensor being arranged to sense the temperature of said heated fluid, said second sensor being operatively connected to said control means, for inputting a signal indicative of the temperature of said fluid.

4. An air conditioning unit as claimed in claim 1, wherein said control means comprises a microcomputer, said microcomputer including a RAM, a ROM and a CPU, said microcomputer being responsive to said sensor which senses the temperature of the air in said duct.

5. An air conditioning unit as claimed in claim 4 further comprising a sensor which senses the temperature of said fluid and inputs a signal indicative thereof to said microcomputer.

6. An air conditioning unit as claimed in claim 5, further comprising sensors which sense the temperature of the air external of said vehicle, the insolation to which the vehicle is subjected, and the temperature of the air within said cabin.

7. An air conditioning unit as claimed in claim 6, further comprising:
   a first device for selectively causing the air inducted into said duct to be inducted from one of said cabin and atmosphere external to said vehicle; and
   a second device for varying the amount of air inducted into said duct which is heated by said heat exchanger.

8. An air conditioning unit as claimed in claim 7, wherein said computer includes a program for controlling the operation of said blower, said first device and said second device in response to data inputted thereto by said sensor which senses the temperature of the air in said duct, said sensor which senses the temperature of said fluid, said sensor which senses the temperature of the air external to said vehicle, said sensor which senses the insolation to which the vehicle is subjected, and the sensor which senses the temperature of air within said cabin.

9. In a vehicle an air conditioning unit for conditioning the air within a cabin of said vehicle, comprising:
   a duct for inducting air and for discharging the inducted air into said cabin;
   a source of heated fluid;
   a heat exchanger through which said heated fluid circulates, said heat exchanger being arranged to heat the air in said duct;
   a blower associated with said duct and energizable to induce air to flow through said duct;
   a sensor for sensing the temperature of the air in said duct and outputting an signal indicative thereof;
   a switch for selectably placing said air conditioning system in one of an operative and inoperative condition; and control means, responsively connected to said sensor and said switch, and controllingly connected to said blower, for driving said blower at a controlled speed variable depending on the value of said sensor indication, said control means being responsive to said sensor signal for driving said blower at a standby speed when said signal indicates that the temperature of the duct air is below a first predetermined value, for driving said blower at a minimum speed greater than said standby speed when said signal indicates that the temperature of the duct air is above said first predetermined value and below a second predetermined value greater than said first predetermined value, and for increasing the speed of said blower to a controlled speed in a range between said minimum speed and a maximum speed when said signal indicates that the duct air temperature is above said second predetermined value, said control means further comprising means for deriving said controlled speed based on blow control parameters.

10. An air conditioning unit as claimed in claim 9, further comprising a second sensor for sensing the temperature of said fluid and producing an output indicative of said fluid temperature; said control circuit being responsive to the output of said second sensor to energize said blower at said standby speed lower than said minimum speed upon said second sensor indicating that the temperature of said fluid is below a third predetermined temperature, said third predetermined temperature being lower than said first predetermined temperature.

11. A method of operating an air conditioning unit for a vehicle having a cabin, said air conditioning unit including:
  a duct for inducting air and discharging the inducted air into said cabin;
  a source of heated fluid;
  a heat exchanger through which said heated fluid circulates, said heat exchanger being arranged to heat the air in said duct;
  a sensor for sensing blower control parameters including the temperature of the air in said duct and outputting a signal indicative of said blower control parameters; and
  a blower associated with said duct and energizable to induce air to flow through said duct; the method comprising the steps of:
  energizing said blower at a standby speed in response to said signal indicating that the air being induced to flow in said duct has a temperature below a first predetermined temperature; and
  increasing the blower speed to a minimum operational speed when said signal indicates that the duct air temperature has exceeded said first predetermined temperature, said minimum operational speed being substantially greater than said standby speed, and maintaining said blower speed at said minimum operational speed until said signal indicates that said duct air temperature has exceeded a second predetermined temperature greater than said first predetermined temperature; and
  deriving an operational speed based on said signal, and controlling said blower to operate at said operational speed, when said signal indicates that said duct air temperature is greater than said second predetermined temperature.

12. A method of operating an air conditioning unit for a vehicle having a cabin, said air conditioning unit including:
  a duct for inducting air and discharging the inducted air into said cabin;
  a source of heated fluid,
  a heater exchanger through which said heated fluid circulates, said heat exchanger being arranged to heat the air in said duct;
  a sensor for sensing blower control parameters and outputting a signal indicative thereof;
  a blower associated with said duct and energizable to induce air to flow through said duct;
  a first sensor associated with said duct for sensing the temperature of the air in said duct and outputting a first signal indicative of said duct air temperature; and
  a second sensor for sensing the temperature of said fluid and outputting a second signal indicative of said fluid temperature; method comprising the steps of:
  driving said blower at a standby speed in response to said second signal having a value lower than a first predetermined value representative of a first predetermined temperature;
  increasing the blower speed to a first speed less than said standby speed and energizing said blower at said first speed upon said second sensor signal having a value greater than said first predetermined value and thus indicating that the temperature of said fluid is above said first predetermined temperature;
  increasing the the blower speed to an operational speed derived based on said blower control parameters within a predetermined speed range when said first sensor signal value becomes greater than a second predetermined value representative of a second predetermined temperature which is higher than said first predetermined temperature and thus indicating that the temperature of the air flowing in said duct is above said second predetermined temperature.

13. An air conditioning unit as claimed in claim 1, wherein said standby speed is substantially zero.

14. An air conditioning unit as claimed in claim 9, wherein said standby speed is substantially zero.

15. An air conditioning unit as claimed in claim 1, wherein said blower is driven at a speed which is substantially lower than said minimum speed while it is driven at said standby speed, said minimum speed being selected to create air flow in said duct small enough so as not to be sensed by a passenger in said cabin.

16. An air conditioning unit as claimed in claim 9, wherein said blower is driven at a speed which is substantially lower than said minimum speed while it is driven at said third speed, said standby speed being selected to create air flow in said duct small enough so as not to be sensed by a passenger in said cabin.

17. A method as claimed in claim 11, in which said standby speed is substantially zero.

18. A method as claimed in claim 12, in which said standby speed is substantially zero.

19. A method as claimed in claim 11, in which said standby speed is selected to create a negligible air flow in said duct large enough to permit measurement of temperature of the air and small enough not to be sensed by a passenger in said cabin.

20. A method as claimed in claim 12, in which said standby speed is selected to create a negligible air flow in said duct large enough to permit measurement of temperature of the air and small enough not to be sensed by a passenger in said cabin.

* * * * *